Nov. 29, 1960 W. E. TANNER 2,962,671
BALANCED FREQUENCY MODULATION FOR TRANSMITTERS
Filed Feb. 23, 1956 2 Sheets-Sheet 1

WALTER E. TANNER
INVENTOR

BY Bean, Brooks Buckley & Bean
ATTORNEYS

INVENTOR:
WALTER E. TANNER,

BY Bean, Brooks, Buckley & Bean,
ATTORNEYS 2,962,671

BALANCED FREQUENCY MODULATION FOR TRANSMITTERS

Walter E. Tanner, Lexington, Mass., assignor, by mesne assignments, to Bell Aerospace Corporation, Wheatfield, N.Y., a corporation of Delaware Filed Feb. 23, 1956, Ser. No. 569,952

1 Claim. (Cl. 332—24)

(Filed under Rule 47(b) and 35 U.S.C. 118)

This invention relates generally to radio transmitters and more particularly to radio transmitters employing frequency modulation as a means of transmitting intelligence.

In one application of thhe telemetering art, a radio transmitter is located at the site of the phenomenon whose characteristics are to be measured. The signal applied to the input stages of this transmitter is representative of the characteristic to be measured, such as temperature, altitude, shock of impact, and the like, and is produced by a transducer capable of translating the observed characteristic into a corresponding electrical signal. Many forms of such a system have been devised and employed in the past, with varying degrees of success. However, the ever-present conflict between economy of manufacture on the one hand and operational accuracy and reliability on the other has caused the devices of the prior art to have shortcomings which cannot be ignored in many applications.

For example, some of the devices used in the past have gained accuracy and reliability of operation only at the expense of size and weight. Also, it is generally true of the prior art devices that an increase in power handling capabilities has resulted in a correspondingly larger physical size. Where power consumption is increased, the heat dissipating capabilities of the device must be increased, normally resulting in a further increase in the physical size of the unit. This is particularly true for high altitude operation where air cooling by convection is reduced to a minimum.

It is a primary object of the present invention to overcome the aforementioned disadvantages of the prior art devices by providing a light weight, extremely compact radio transmitting unit of the frequency modulation type which is characterized by extremely reliable and accurate operation even at high levels of power output.

Another object of the invention is to provide a transmitter of the type described which is rugged in design and which will provide satisfactory operation even under extreme conditions of physical environment.

A further object of the invention is to provide a transmitter of the type described which can be easily serviced in spite of its compact design.

Still another object of the invention is to provide a device of the type described which is characterized by simplicity of manufacture and attendant low cost of production.

In carrying out the invention, a transducer converts the characteristics of the phenomenon to be observed into corresponding signals of varying amplitude. These signals are applied to a novel balanced reactance tube modulator which frequency-modulates the oscillations of an oscillator-doubler stage, the frequency-doubling function of this latter stage serving to increase the frequency swing or travel of the modulations impressed on the oscillations of the oscillator. The output of the oscillator-doubler stage is then applied to a grounded-grid drive and buffer stage which, in turn, drives a synchronized oscillator output stage. The transmitting antenna is connected to the output of this last stage and serves to radiate the frequency-modulated signal in the manner well known in the art.

The use of the novel balanced modulation circuit results in an increase in frequency stability, a decrease in harmonic modulation distortion and the ability to transmit pulse signals with substantially no distortion of the pulse shape. The use of frequency modulation rather than phase modulation permits transmission of pulses without phase distortion. As previously mentioned, the frequency-doubling action provides an increased deviation from center frequency for a given input amplitude. The shielding or buffering characteristics of the grounded-grid stage are well known and here serve to isolate the frequency deviation determining stages from the power output stage, thereby preventing interaction or frequency pulling by the latter stage. In order to obtain a satisfactorily large output with good over all efficiency, the output stage is in the form of a simple power oscillator whose output is synchronized by the signal from the preceding stages.

The above and other objects and advantages of the present invention will best be understood by referring to the following detailed description, taken in conjunction with the accompanying drawings, in which.

Figure 1:
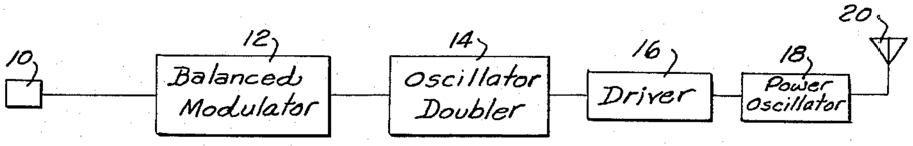
Fig. 1 is a block diagram of a system employing the circuitry of the invention.

Referring to Fig. 1, transducer 10 may be of any type suitable for translating into electrical signals of varying amplitude the varying characteristics of the phenomenon desired to be observed or monitored. While the apparatus would operate from continuously varying input signals, certain of its advantages are especially adapted to transmission of intermittent or pulse information; in any event, the control signals derived from the transducer are preferably balanced to ground. Where the transducer is a simple variable resistor or similar element, balanced output therefrom can readily be obtained, either at the transducer or at the other end of the control signal channel, by using a transformer having balanced secondary windings or a single secondary winding having its center point connected to the ground or zero voltage reference potential of the system. It will also be understood by those skilled in the art that these control signals may themselves be transmitted over wire lines, local radio link or other channel, to be converted into frequency-modulated waves for ultimate transmission to a more remote point.

The control signals from transducer 10 are applied to a balanced reactance-tube modulator apparatus 12 of novel form, to be described in detail below, which controls the output frequency of a conventional oscillator and frequency-doubler stage 14, in turn connected by a driver and buffer stage 16 to the final power oscillator 18 feeding the antenna 20. In other words, the system is essentially one in which a power oscillator has its output frequency synchronized by a preceding lower-level stage whose control is modulated by the frequency shifts introduced by the original control signals or pulses. The general arrangement of such a transmitter is well understood in this art.

One of the problems in the design of transmitters intended for telemetering applications has been the difficulty in obtaining wide frequency swings in the output wave energy, without involving large, heavy or costly transmitter equipment. In many applications, especially where the transmitter is airborne (either by plane, craft, balloon or the like) size and weight are very restricted; at the same time, a wide frequency swing is needed for reliable operation, and must be obtained with carriers having very high center of nominal frequencies. The invention solves this problem by a novel system of frequency modulation as already mentioned, which will now be described in detail in connection with Fig. 2 of the drawings.

Figure 2:
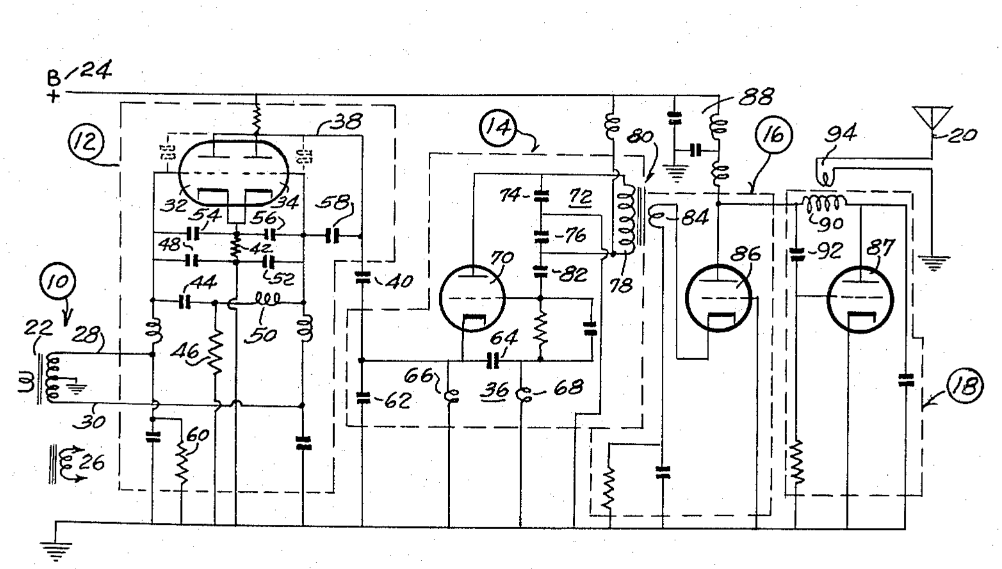
Fig. 2 is a schematic diagram of the details of circuitry of the invention.

In Fig. 2, the major components indicated by blocks in Fig. 1 have been outlined in dash lines and numbered to correspond to Fig. 1. Thus, numeral 10 indicates generally the transducer portion, here shown as providing a balanced signal output by the use of a transformer 22 with center-tapped secondary winding. Space path direct current supply for all of the following vacuum tubes is indicated by source 24, which may be supplied by the electrical system of a craft or vessel, or may be independently supplied as dictated by the application of the transmitter. Likewise, numeral 26 indicates a suitable source of cathode heater current for these tubes.

The control or input signals from the transducer section are applied over leads 28, 30 to the respective grid electrodes of a pair of matched triode amplifier tubes 32 and 34. While equivalent tube types may be employed, for operation at frequencies as high as 120 megacycles per second, a miniature triode designated as JAN type 6111–A has been found preferable. Ordinarily, such a triode tube would be considered to have a plate-to-grid capacitance much too high to permit its use as a reactance tube for frequency modulation at such high frequencies, but the novel circuit of the invention permits such use by employing a balanced arrangement which actually utilizes this inherent capacitance in introducing the effect of the control variations into the tank circuit of the following oscillator. The tube shown is a twin triode in a single envelope, but separate triodes could be employed if their characteristics are well matched and otherwise meet the requirements of the circuitry.

Briefly, the novel modulation circuit operates to provide control of the following oscillator frequency by simulating a reactance connected in parallel with the tank circuit of the oscillator, and differs from prior proposals in that not only is the magnitude of this effective added reactance controlled by the applied input or control signal from the transducer, but its reactive character is automatically changed from inductive to capacitive in accordance with swings of the control voltage over its entire range encompassing, in the case of a balanced input, relative polarity shift in the signal. To this end, each triode section 32, 34 of the tube, or each triode where separate envelopes are employed, has its grid fed from an intermediate point on a network comprising resistance and reactance, the reactances in the two circuits being of opposite kind; that is, capacitive and inductive respectively. Thus, while both the triode sections have their anode electrodes connected to the tank circuit 36 of the following oscillator, over lead 38 and coupling capacitance 40, and their cathode electrodes connected to the ground or reference potential through cathode biassing resistor 42, the grid of triode section 32 is connected to ground through a network consisting of a capacitance 44 in series with the common resistor 46, both being shunted by a second capacitor 48.

In a symmetrical way, the grid or control electrode of the other triode section 34 is connected to ground through a network consisting of an inductance 50 in series with the common resistor 46, the two being shunted by a capacitor 52. The values of these components are so chosen that the capacitances 48 and 52 are equal, and so that the capacitive reactance of capacitor 44 equals the inductive reactance of coil 50, at the nominal carrier frequency at which the following oscillator is tuned. In this connection, it will be understood that this frequency is doubled, as is conventional, by a succeeding stage, which doubling does not affect the operation of the novel modulator. For a nominal initial frequency of approximately 120 megacycles per second, the values of 48 and 52 may be 47 micromicrofarads (mmf.), and that of 44, 10 mmf. The common cathode bias resistor 42, for the tube type mentioned, may be 470 ohms, and resistor 46 10,000 ohms. By-pass capacitors 54, 56 may have the value 10 mmf. Coil 50 will have an inductive reactance equivalent to condenser 44 at the operating frequency, as stated.

It will be observed that the grid-to-ground circuits of the two triode sections are balanced and equivalent, except that the place occupied by capacitor 44 in the first triode section is occupied by the inductance 50 for the second triode. Each of the triode sections acts as a variable reactance in a manner which will be readily understood by those familiar with reactance tube modulators. Thus, referring to triode secion 34, for example, the RF voltage of the tank circuit 36 of the oscillator is coupled to the grid circuit of section 34 via the inherent plate-to-grid capacity of that triode indicated in the drawing by a dash line capacitor. The RF voltage across the series combination of inductance 50 and resistor 46 will lead the current because of the well-known property of an inductance which causes its current to lag the applied voltage. The RF current in the modulator plate circuit will be in phase with the RF voltage on the grid, and consequently will lead the current through the inductance-resistance combination. This leading current is drawn through the oscillator tank, and since drawing a leading current is a property of a capacitance, the modulator tube simulates a capacitance connected in parallel with the tank circuit. In a symmetrical manner, the network connected to the grid of triode section 32 presents a simulated inductance across the tank circuit. Since the balanced or push-pull input signal produces increased space current in triode 32 for decreasing values of space current in section 34, and vice versa, the result insofar as it affects the resonant frequency of the oscillator tank 36 is equal to a range of variation in resonant frequency equal to the algebraic sum of the variations individually produced by the triode sections. The balanced arrangement, besides providing a wide frequency or modulation swing, and substantially eliminating any drawback otherwise inherent in the plate-to-grid capacitances of the triode sections, provides a good degree of immunity from effects due to variations in the supply voltages, as well as relative freedom from harmonic distortion in the wave form of the oscillator.

To ensure coupling of the RF tank energy to the modulator grids, an artificial unbalance capacitance 58 which may be of the order of 1 mmf. is connected as shown between the plate and grid of triode 34. Inductance 50 is preferably made adjustable, so that the condition of balance can be maintained accurately to achieve maximum frequency swing for changes or variations in the frequency of the following oscillator; for example, those incident to a change in the carrier frequency to be radiated. The direct-current path from the grid of triode section 32 to ground is completed through a resistance 60, which may have the value of 100,000 ohms; no such return is needed for section 34 since inductor 50 (and resistor 46) will normally provide a D.-C. path for this tube.

The oscillator-doubler stage 14 is of generally conventional type, including an input tank circuit 36 comprising essentially capacitors 62 and 64 and inductances 66 and 68, connected in the cathode circuit of oscillator-doubler tube 70. It is this tank whose effective reactance is modulated by stage 12 as already described. The plate tank circuit 72 of the stage includes capacitors 74 and 76, and inductance 78, which forms also the primary of the stage's output transformer 80. This tank is adjusted to resonate at approximately twice the frequency of the input tank at zero modulation input. Thus, the output of the oscillator-doubler stage 14 energizes the cathode circuit of the grounded-grid driver stage 16 which in turn synchronizes the output of the final power oscillator 18 at a value substantially twice the frequency of the input tank 36 of doubler stage 14. The plate-to-grid feedback path of oscillator-doubler 14 can be traced through capacitor 82; grid bias for the stage is provided by a conventional grid-leak circuit indicated in the drawing and requiring no further description.

Transformer 80 has its secondary winding 84 connected between grid and cathode of tube 86 of driver stage 16, which receives its plate supply through a filter 88 arranged to eliminate any traces of the half-value frequency present in the doubler output. The driver stage applies, from the secondary winding 84 of transformer 80, the frequency-modulated signal as a synchronizing signal for the power oscillator stage 18. The latter is a simple phase-shift oscillator tube 87 whose space current is supplied from the anode of driver tube 86, inductance 90 and capacitor 92 providing the necessary 180° phase shift between plate and grid voltages at the desired nominal or unshifted center frequency. Inductance 90 is conveniently the primary of an output transformer whose secondary 94 delivers the final signal to the antenna 20, as shown.

Typical circuit values for a transmitter according to the invention are tabulated as follows (200 volts D.C. plate supply, 80 milliamperes):

| | |
|---|---|
| Tubes: | |
| 32, 34 | JAN 6111–A twin triode. |
| 70, 86, 87 | JAN 5703–WA triodes. |
| Capacitors: | |
| 48, 52 | 47 mmfd. |
| 44, 54, 56 | 10 mmfd. |
| 58 | 1 mmfd. |
| 40 | 33 mmfd. |
| 62, 64 | 15 mmfd. |
| 74, 76, 92 | 5 mmfd. |
| 82 | 1.5 mmfd. |
| Resistors: | |
| 42 | 470 ohms. |
| 46 | 10,000 ohms. |
| 60 | 100,000 ohms. |

The provisions which have been described above yield the possibility of an extremely compact transmitter. Using the recommended tube types and circuit constants, listed below, a power output of about 4 watts at a final carrier center frequency of 215 to 235 megacycles per second can readily be obtained, with a frequency excursion of plus or minus 125 kilocycles. The total heat dissipation is only 18 watts, but the dissipation of even this quantity of energy becomes a problem when the dimensions of the transmitter are to be kept small, as is made possible by the present design and especially at high altitudes where convection cooling is ineffective. Thus, an exemplary transmitter made according to the invention may be wholly contained within a few cubic inches and with a total weight of only 0.8 of a pound. The preferred way in which the heat dissipation is accomplished will now be described in connection with Figs. 3 and 4 of the drawings.

Figure 3:
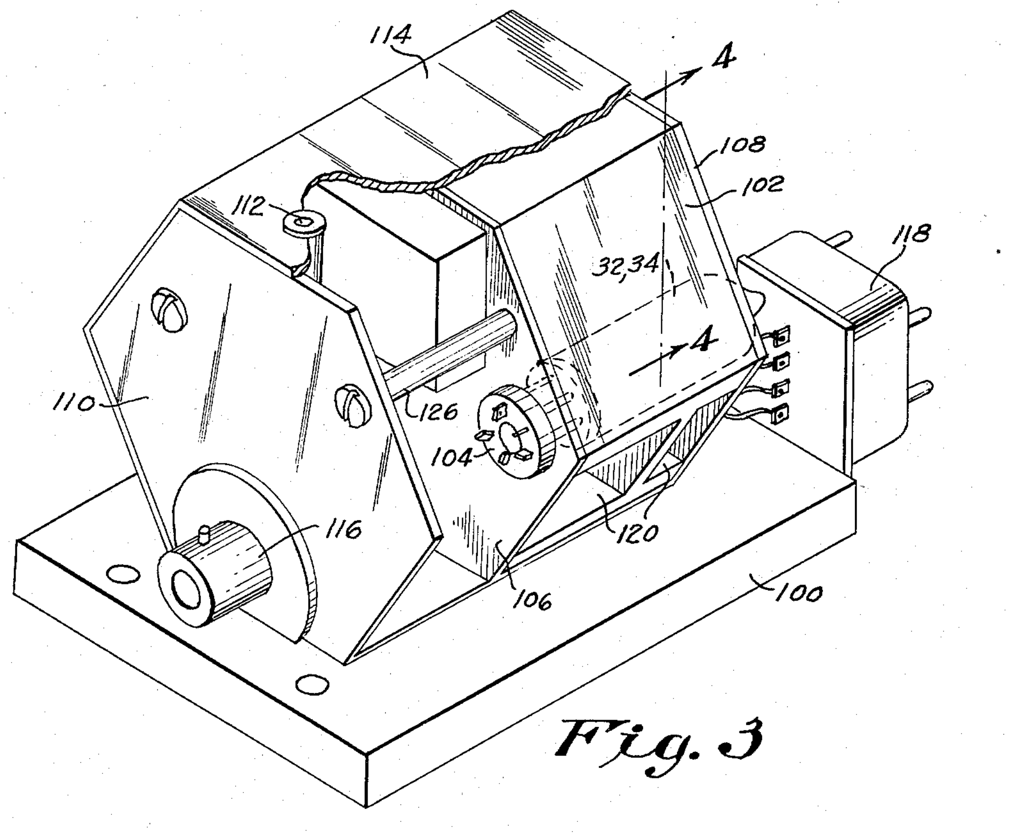
Fig. 3 is a perspective view, partially broken away, of a preferred form of the physical arrangement of the components of the invention.

For maximum flexibility in mounting, as well as to increase surface area relative to volume, the general pattern of the transmitter is hexagonal. Since the heat dissipated in the four tubes (considering the modulator as a single tube envelope) will have to be disposed of principally by radiation and conduction, these tubes are almost totally enclosed within a solid block of aluminum provided with a well-fitting copper cover or shield which can be firmly secured in good heat-transmitting relation to the framework or chassis to which the transmitter is to be mounted. In Fig. 3, the basic support or framework (as of an aircraft) is indicated as metal plate 100, and the aluminum block is designated 102. The latter is of hexagonal cross-section, and is bored axially to receive the tubes. As shown in dotted lines, one tube such as tube 32, 34, is located in an axial position in one such hole, the same being adjacent an apex of the hexagonal block 102. The other tubes are similarly disposed at angular positions 120° from the one shown, and the fourth is placed in an axial bore which is centrally located in the hexagon. All of the tubes are received in conventional sockets such as the one indicated at 104, carried upon an insulating mounting plate 106 facing one end of the block.

A similar plate 108 is disposed at the opposite end of the block, both plates 106 and 108 serving for the mounting of circuit components such as condensers, resistors and the like. A third plate 110, forward of plate 106, provides between it and the block space for additional components including, as shown, the tuning inductance 112 for the output stage, so that the latter is available for last-minute alignment purposes. The copper cover strip 114 is shown partly broken away, for clarity, and no attempt has been made to illustrate the precise positions of the minor components. The modulated output energy may be made available at the socket connector 116 for delivery to the antenna, and the signal and power supply voltages are connected by the multiple plug terminal 118 at the opposite end of the device. Certain portions of the block 102 may be internally cut away, as at 120, to provide additional space for heat dissipating resistors or other components. Since the copper cover is in intimate contact with the aluminum block, good conduction of heat away from the block is assured.

Figure 4:
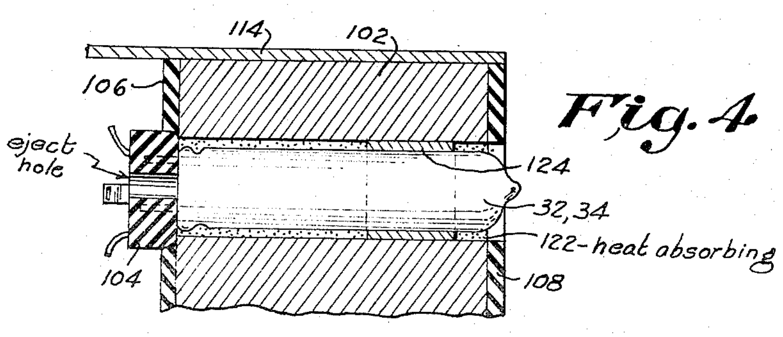
Fig. 4 is a fragmentary enlarged section of the structure of Fig. 3, taken on line 4—4 thereof.

In order to ensure adequate transfer of the heat from the tubes to the block 102, the recesses or bores containing them are, as indicated at 122 in Fig. 4, sand-blasted and painted with heat-absorbing paint. A sleeve 124 may be provided to keep the tube centered in the hole. Retaining springs may be added to maintain the tubes in their sockets, if desired. Each tube socket is apertured so that the corresponding tube can be ejected from the socket and the block by inserting an instrument through such holes. Mounting studs such as 126 may connect the plates 106 and 110 for greater rigidity, and may even extend through the aluminum block if desired. The resulting assembly can readily be mounted in any position with a flat face of good contact area engaging the surface upon which the transmitter is carried.

While the invention has been described above in connection with a certain specific embodiment which has been illustrated for purposes of example and ready understanding, it will be understood that various modifications as to detail will occur to those skilled in the art. The scope of the invention claimed is therefore not to be understood as limited by the illustrations and examples given, but only as defined in the appended claim.

What is claimed is:

A frequency modulated wave transmitter comprising a thermionic discharge tube oscillator stage including a tuned circuit connected to establish a nominal oscillation frequency for said stage, and a balanced modulator stage connected to said tuned circuit to alter its resonant frequency by varying the effective shunt reactance across said tuned circuit, said modulator stage comprising a matched pair of thermionic modulator devices comprising cathode and anode electrodes and separate discharge controlling electrodes, and a static modulator network comprising a closed-mesh bridge formed of four legs each including an impedance element; two adjacent legs containing matched capacitors with their junction point connected to the cathodes of said devices, the two remaining legs containing respectively a capacitor and an inductance having respective impedances which are equal at said nominal frequency value, with their junction point connected by a resistance to a point of reference potential, a resistance connecting said point to the first-named junction point, means connecting the remaining two junction points to the separate discharge controlling electrodes of said devices, and means for applying balanced modulating potentials between said point of reference potential and said remaining junction points respectively.

References Cited in the file of this patent

UNITED STATES PATENTS

| | | |
|---|---|---|
| 2,309,083 | Usselman | Jan. 26, 1943 |
| 2,326,314 | Usselman | Aug. 10, 1943 |
| 2,374,000 | Crosby | Apr. 17, 1945 |
| 2,422,422 | Korman | June 17, 1947 |
| 2,486,230 | Van Lammersen | Oct. 25, 1949 |
| 2,510,787 | Wheeler | June 6, 1950 |
| 2,652,537 | Stull | Sept. 15, 1953 |
| 2,737,579 | Wehrlin et al. | Mar. 6, 1956 |
| 2,777,992 | Anderson | Jan. 15, 1957 |
| 2,790,147 | Armstrong et al. | Apr. 23, 1957 |

FOREIGN PATENTS

| | | |
|---|---|---|
| 1,103,877 | France | June 1955 |